US009075836B2

(12) United States Patent
Matsakis

(10) Patent No.: US 9,075,836 B2
(45) Date of Patent: Jul. 7, 2015

(54) PARTITIONING KEYS FOR HASH TABLES

(75) Inventor: Nicholas D. Matsakis, Milford, PA (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 12/888,702

(22) Filed: Sep. 23, 2010

(65) Prior Publication Data
US 2012/0078970 A1    Mar. 29, 2012

(51) Int. Cl.
*G06F 17/30* (2006.01)
(52) U.S. Cl.
CPC ...... *G06F 17/3033* (2013.01); *G06F 17/30336* (2013.01)
(58) Field of Classification Search
CPC .............................. G06F 17/30; G06F 17/3033
USPC .................. 707/698, 747, E17.036, E17.045, 707/E17.052, 999.101
See application file for complete search history.

(56) References Cited

U.S. PATENT DOCUMENTS

| 6,578,131 | B1 | 6/2003 | Larson et al. |
| 7,542,975 | B2 | 6/2009 | Rjaibi |
| 8,521,751 | B2 * | 8/2013 | Ichino ............................ 707/754 |
| 2005/0063382 | A1 * | 3/2005 | Fenner ........................... 370/389 |
| 2006/0218176 | A1 * | 9/2006 | Sun Hsu et al. ............... 707/102 |
| 2008/0052488 | A1 | 2/2008 | Fritz et al. |
| 2009/0006607 | A1 | 1/2009 | Bu et al. |
| 2009/0171651 | A1 | 7/2009 | Lunteren et al. |
| 2009/0271366 | A1 | 10/2009 | Ellison et al. |
| 2010/0106734 | A1 | 4/2010 | Calder et al. |
| 2010/0135305 | A1 | 6/2010 | Lu et al. |
| 2010/0185941 | A1 | 7/2010 | Achilles et al. |
| 2010/0217953 | A1 * | 8/2010 | Beaman et al. ................ 711/216 |

OTHER PUBLICATIONS

"Ideal Hash Trees", Bagwell, Es Grands Champs, 2001, pp. 1-18.*
"Using Difficulty of Prediction to Decrease Computation: Fast Sort, Priority Queue and Convex Hull on Entropy Bounded Inputs", Chen et al., Foundations of Computer Science, 1993.*

* cited by examiner

*Primary Examiner* — Alexey Shmatov
*Assistant Examiner* — Hubert Cheung
(74) *Attorney, Agent, or Firm* — Prentiss Johnson; Edell, Shapiro & Finnan, LLC

(57) ABSTRACT

A method, computer program product, and system for partitioning keys for a hash table in order to improve performance of the hash table. A hash function is used to generate a hash table by mapping a set of keys to a corresponding set of hash codes, and a hash failure is detected if the hash function fails to map the entire set of keys. To resolve the hash failure, the set of keys is partitioned to form subsets of keys that can be individually mapped.

23 Claims, 5 Drawing Sheets

PARTITIONING KEYS FOR HASH TABLES

BACKGROUND

1. Technical Field

The present invention relates generally to hash functions, and more particularly to improving the performance of hash tables.

2. Discussion of Related Art

A hash table or hash map is a data structure used for storing and accessing data in computer systems, which associates a given key with a given value. A hash function is used to transform the key into a hash value (also called a hash code or hash sum) that serves as an index to an array element (e.g., a hash bucket) in the hash table where the key's corresponding value is stored. The hash table thus helps to speed up table lookup or data comparison tasks, such as finding items in a database. Ideally, the hash function would map each key to a unique hash value, but this ideal is difficult to achieve in practice and generally most hash functions result in at least one collision, i.e., two or more keys are mapped to the same hash value. Any collision in a hash table increases the average cost of lookup operations, thereby degrading the performance of the hash table. In most applications, it is desirable to minimize collisions, e.g., by preventing their occurrence or by resolving collisions as they occur during the generation of a hash table, in order to improve performance of the hash table.

BRIEF SUMMARY

Accordingly, embodiments of the present invention include a method, computer program product and a system for partitioning keys for a hash table comprising generating a hash table by using a hash function to map a set of keys to a corresponding set of hash codes in the hash table, where the keys within the set are mapped in a sequence, detecting a hash failure if the hash function fails to map the entire set of keys; and in response to detecting the hash failure, partitioning the set of keys at a first partition location within the sequence to form a plurality of individually mapped subsets of keys, where the first partition location is variable and is based on the detected hash failure.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
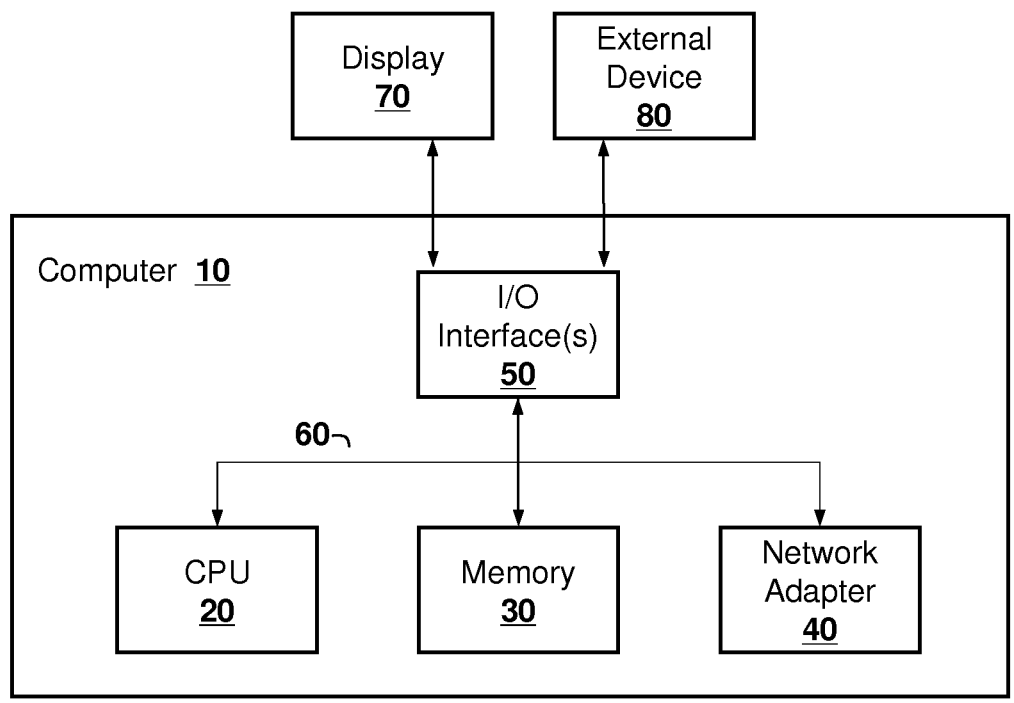
FIG. 1 is a block diagram illustrating an exemplary computer system for generating a hash table according to an embodiment of the present invention.

Referring now to the Figures, an exemplary computer system 10 according to embodiments of the present invention is illustrated in FIG. 1. The exemplary computer system 10 comprises a processor 20, memory 30, network adapter 40, and I/O interface(s) 50, all communicatively coupled together by system bus 60. The computer system 10 may be communicatively coupled to a display 70, and one or more external devices 80, such as an input device (e.g., touch screen, keyboard, etc.) or output device (e.g., printer, etc.).

Memory 30 may be implemented by any conventional or other memory or storage device, and may be volatile (e.g., RAM, cache, flash, etc.), or non-volatile (e.g., ROM, harddisk, optical storage, etc.), and include any suitable storage capacity. The network adapter 40 may be implemented so that the computer system 10 can communicate with one or more other systems by any quantity of any suitable communications media (e.g., WAN, LAN, Internet, Intranet, wired, wireless, etc.), through a shared memory, or in any other suitable fashion. The computer systems of the present embodiments may include any conventional or other communications devices to communicate over networks or other communications channels via any conventional or other protocols, and may utilize any type of connection (e.g., wired, wireless, etc.) for access.

Figure 2:
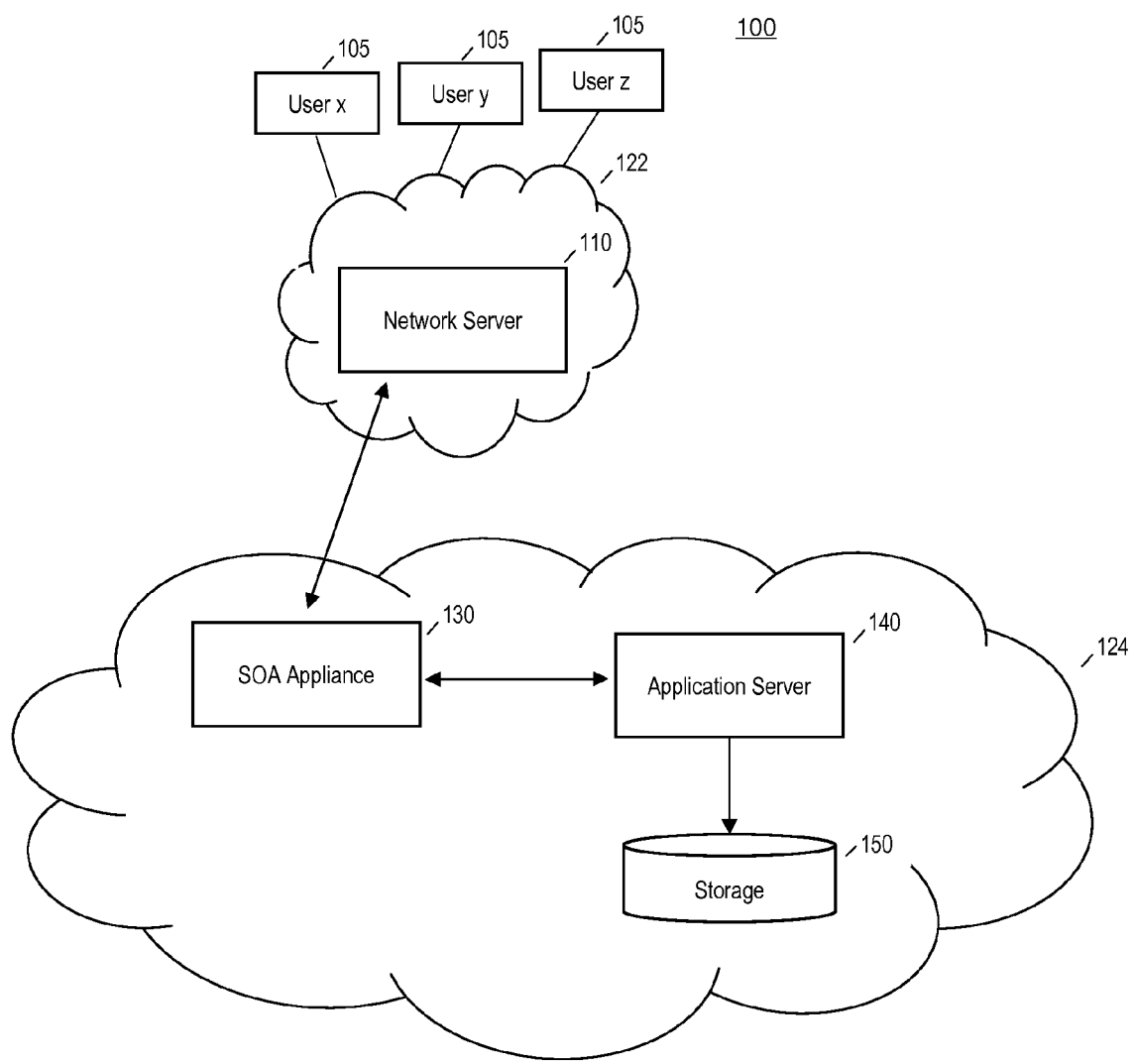
FIG. 2 is a block diagram illustrating an exemplary computer network comprising a computer system of FIG. 1 according to an embodiment of the present invention.

The computer system 10 may be used in a computer network, for example network 100 depicted in FIG. 2. Network 100 comprises a network server 110 connected to multiple user clients 105 via cloud network 122. Cloud network 122 is communicatively coupled to cloud network 124, which comprises an SOA appliance 130 such as an XML appliance, application server 140, and storage 150. SOA appliance 130 may be, or may comprise, a computer system 10 as previously described, and may be, for example, an IBM® WebSphere® DataPower® SOA appliance such as an IBM® WebSphere® DataPower® Integration Appliance X150, IBM® WebSphere® DataPower® XML Security Gateway XS40, or IBM® WebSphere® DataPower® XML Accelerator XA35. (IBM®, WebSphere® and DataPower® are trademarks of International Business Machines Corporation, registered in many jurisdictions worldwide). As shown, the network 100 is a cloud-based network, however it is understood that the computer system 10 may be implemented in other networks and systems, for example a distributed network.

Computer system 10, user clients 105, network server 110, SOA appliance 130, and application server 140 may each be implemented in the form of a processing system, or may be in the form of software. They can each be implemented by any quantity of conventional or other computer systems or devices (e.g., computer terminals, personal computers, tablets, laptops, netbooks, cellular telephones/personal data assistants, etc.), and may include any of many available commercial or open source operating systems and any commercially available or custom software (e.g., browser software, communications software, word processing software, etc.). These systems may include processors, memories, internal or external communications devices (e.g., modem, network card, etc.), displays, and input devices (e.g., physical keyboard, touch screen, mouse, trackpad, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.). Storage 150 may be implemented by any conventional or other memory or storage device, and may be volatile (e.g., RAM, cache, flash, etc.), or non-volatile (e.g., ROM, hard-disk, optical storage, etc.), and include any suitable storage capacity.

The network 100 may include additional servers, clients, and other devices not shown, and individual components of the system may occur either singly or in multiples, for example, there may be more than one SOA appliance 130 in the system, or for example, the functionality of the network server 110 and the SOA appliance 130 may be combined into a single device or split among multiple devices. The network 100 may also be a node, for example a node in a computing cluster, which is connected to other nodes by suitable means, for example via a network. It is understood that any of the various components of the network 100 may be local to one another, or may be remote from and in communication with one or more other components via any suitable means, for example a network such as a WAN, a LAN, Internet, Intranet, mobile wireless, etc.

The computer system 10 may use one or more hash tables to store and access data. For example, a SOA appliance such as, for example, an IBM® WebSphere® DataPower® appliance utilizing an XG4 or XG5 XML processor may utilize one or more hash tables. The XG4 and XG5 processors comprise XML Post Processing Engines (PPE) that are processors with specialized instructions targeted for doing XML processing such as schema validation and SOAP lookups. One of the key features of the PPE is the ability to do a multi-way lookup and branch in one instruction, and the PPE uses a Ternary Content Addressable Memory (TCAM) device for this purpose. Each TCAM entry corresponds to one particular branch and stores the conditions that have to be fulfilled for that particular branch to be selected in the form of a ternary match vector. When the PPE encounters a "CAM lookup" instruction, it creates a key that is sent to the TCAM and is compared simultaneously against all TCAM entries. If a TCAM entry (i.e., a branch) is found that matches the key, then the match location is sent as the address to a "next instruction memory" RAM which in turn produces the address of the next instruction (i.e., the branch target) the PPE should execute. The PPE may parse XML documents into TLA (Type-Length-Attribute) events, and use the TLA events as keys.

In the XG4 and XG5 processors, a lookup algorithm is used to "emulate" the TCAM function using a data structure that is stored in an SDRAM device, in such a way that the size of emulated TCAM is substantially larger than the original TCAM device, thereby allowing an increase in the number of PPE programs which can be resident in memory. The data structure contains a separate hash table for each "current instruction pointer" value, in which all original TCAM entries are stored that relate to that current instruction pointer. When the PPE sees an emuICAM instruction, it triggers a lookup operation on the hash table, comprised of generating a hash code, accessing the data structure to fetch the corresponding hash table entry, and performing a compare operation of the retrieved hash table entry with the original key to determine the lookup result. For this purpose, the emuICAM instruction contains the pointer to the hash table and also information on how the hash index is generated from the input key. The hashes are used in the emuICAM instruction to branch depending on what events appear next in the input. In this case, the keys in the hash table may be the name of XML elements or attributes of interest, or similar details. Because the XG4 and XG5 processors depend so heavily on hashing to accomplish emulation of the TCAM function, and because the hashing algorithms used in these processors are implemented in hardware, the present embodiments offer the benefit of reducing collisions and improving the performance of the hash tables, and thus, the TCAM emulation, as is described below in more detail.

One problem that arises in the application of hash functions is that of collision. A hash function is deterministic in that two identical or equivalent inputs must generate the same hash code. If two keys hash to the same hash code, a collision results. This may occur because the key is similar or identical. A number of other factors may force the hash function to result in collisions, for example, if only a fixed number of bits are used in the hash function, more collisions may result because a greater number of bits are required to resolve collisions. Another factor that may lead to collisions is that some portions of the key may not be usable in the hash function, for example the name of an element may be hashed, but its depth may not be, although the depth is still a part of the key. In this scenario, two keys whose hashable portion is the same but whose unhashable portion differs will always be in the same hash bucket, regardless of the hash function used. Additionally, if wildcard keys are supported, then a particular wildcard key might match any element, or any elements whose name is in a particular namespace, rather than a specific element. In this scenario, this key would appear in every hash bucket.

Figure 3:
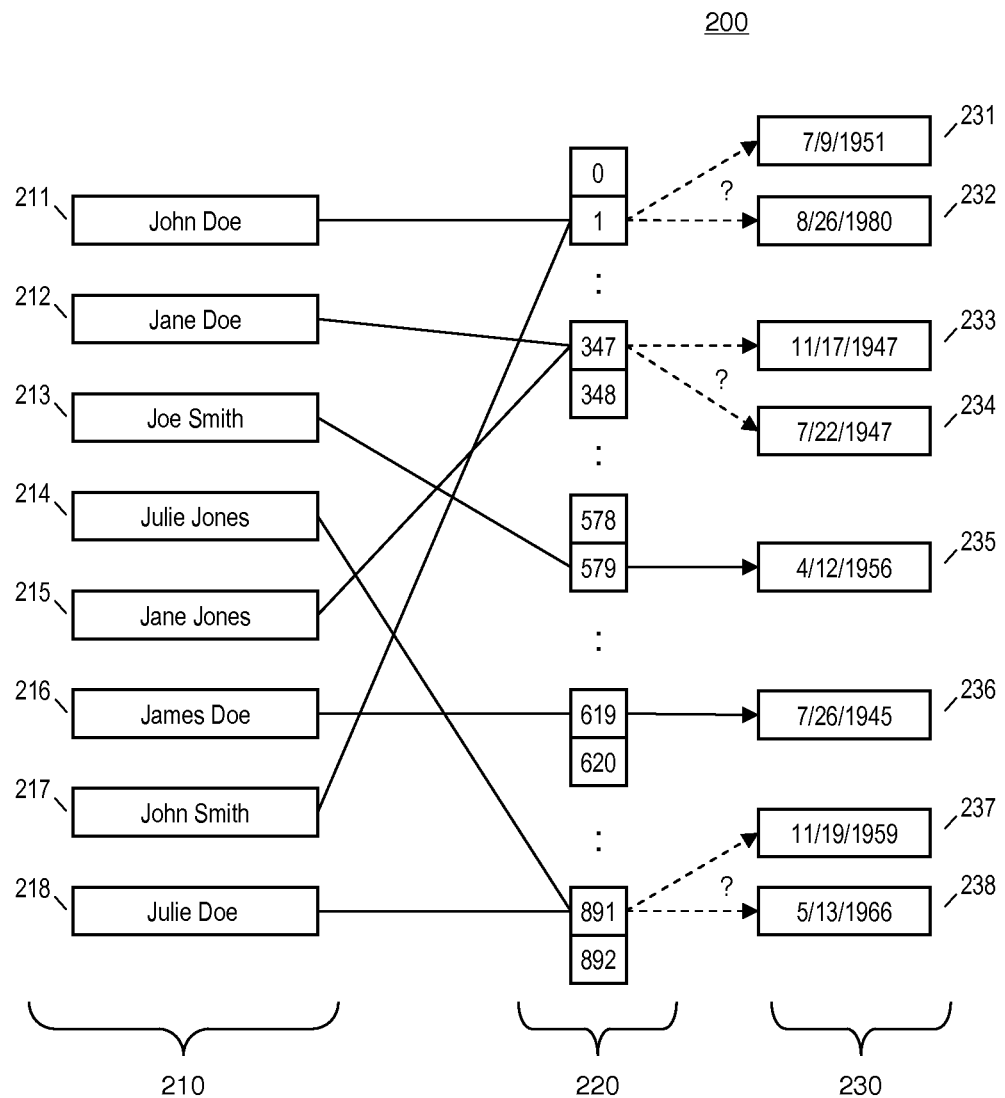
FIG. 3 is a block diagram depicting an exemplary hash table having conflicting keys according to an embodiment of the present invention.

For example, FIG. 3 illustrates a hash table 200 having several conflicting keys resulting in data collisions. The hash table 200 includes keys 210 (e.g., names 211-218), which are mapped using a hash function to a corresponding set of hash codes 220. The keys may be any type of data that is desired to be stored. In the exemplary hash table of FIG. 3, the hash codes 220 are used as indices for hash buckets 230 storing values for the keys 210 (e.g., dates of birth shown in individual hash buckets 231-238). For example, key 213 is "Joe Smith" and is mapped to a hash code 220 of "579", which is indexed to hash bucket 235 storing a value of Apr. 12, 1956.

In FIG. 3, three data collisions have occurred because several of the keys are partially identical and the hash function uses a fixed low number of bits. For example, a collision has occurred between key 211 ("John Doe") and key 217 ("John Smith"), which both hash to a hash code 220 of "1". A problem arises because the hash code of "1" cannot index both hash bucket 231 (storing value Jul. 9, 1951 associated with key 211) and hash bucket 232 (storing value Aug. 26, 1980 associated with key 217). This data collision results in inefficiencies and degraded performance, because the collision must be resolved, for example by analyzing the values in the hash buckets to determine which is the correct value associated with each key, or by chaining the hash buckets, or in some other way. Similarly, the collisions between keys 212 and 215 ("Jane Doe" and "Jane Jones"), and keys 214 and 218 ("Julie Jones" and "Julie Doe") also result in poor table performance.

Collisions may be reduced by using an adaptive hash function, which tunes the hash function to the set of keys and thus ensures that the number of collisions is small. For example, a perfect hash function may be used. Depending on the implementation of the hash function, however, there may be a maximum number of collisions that can be accommodated. For example, hashing algorithms implemented in hardware generally cannot accommodate an arbitrary number of collisions, and instead impose a fixed maximum number of collisions that may occur per hash. If a given hash function results in too many collisions, another hash function may be substituted, however, there may be circumstances in which no hash function produces fewer than the maximum number of collisions. One way to reduce the number of collisions is to select in advance an appropriate hash function, but this is not always possible, and may not eliminate all collisions.

Excess collisions and other hash failures degrade hash table performance. The present embodiments solve these failures and thus improve hash table performance by partitioning the set of keys for the hash table into two or more partitions, creating two or more subsets of keys, each of which is associated with a separate hash subtable. For example, in the case of the XML processors described previously, if the processor discovers when constructing the hash bits for an emuICAM instruction that not all of the keys can be accommodated in a single emuICAM instruction, then the set of keys may be divided into two parts at a particular index, which may be referred to as a first partition location or a splitLocation. EmuICAM instruction generation then proceeds in parallel, processing the first part (those indices below the splitLocation) first, and then processing those indices above the splitLocation second. As a result, at least two emuICAM instructions will be generated, however it is possible to generate more than two because either subset of the original set of keys may be split again at a second partition location into a further subset if the maximum number of collisions is still exceeded. No higher-level knowledge is required to carry out this partitioning.

Figure 4:
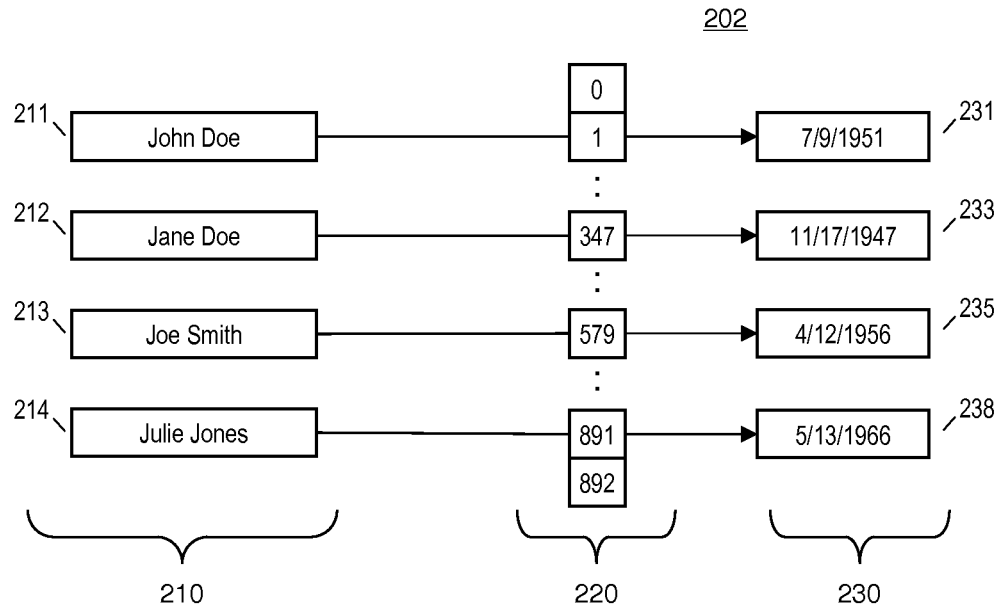
FIG. 4 is a block diagram depicting exemplary hash subtables created by partitioning the hash table of FIG. 3 according to an embodiment of the present invention.
Figure 4:
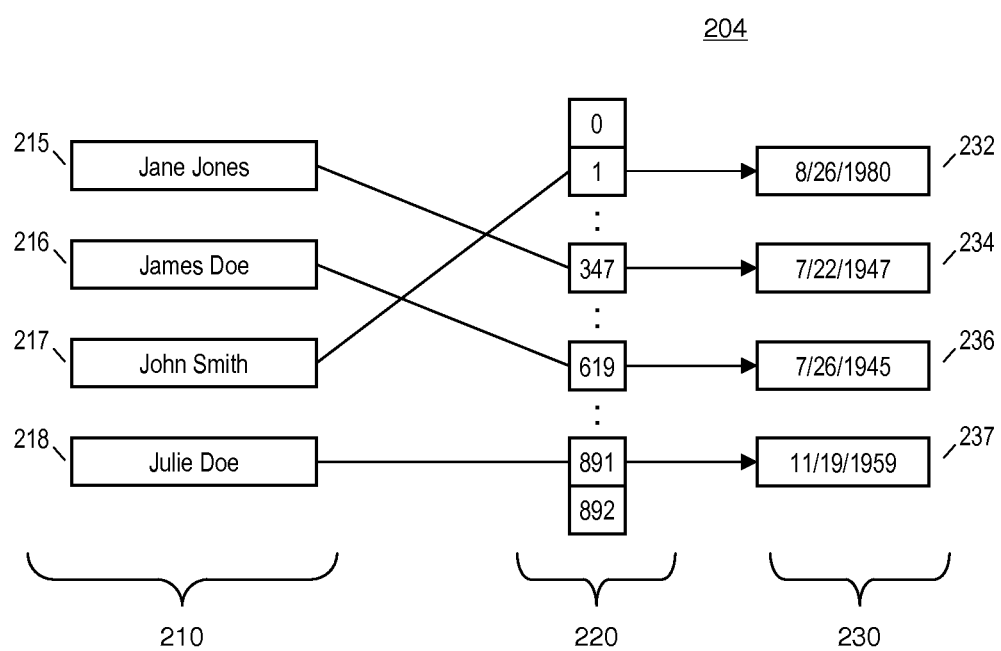

FIG. 4 illustrates the result of partitioning the hash table of FIG. 3 into hash subtables according to the present embodiments. The conflicting keys have been separated, resulting in two hash subtables 202 and 204. Hash subtable 202 includes keys 211, 212, 213 and 214, which are mapped using a hash function to corresponding hash codes of "1", "347", "579" and "891", which act as indices to hash buckets 231, 233, 235 and 238, respectively. Hash subtable 204 includes keys 215, 216, 217 and 218, which are mapped using a hash function to corresponding hash codes of "1", "347", "619" and "891", which act as indices to hash buckets 232, 234, 236, and 237, respectively. Neither hash subtable contains any data collisions because the conflicting keys have been separated.

The set of keys may be sorted by priority before the hash table is generated, so that the keys are mapped in a sequence according to their importance, i.e., higher priority keys are mapped before lower priority keys. For example, because multiple keys may match against a single TLA (Type-Length-Attribute) event, the keys may be sorted into a priority sequence such that keys earlier in the list take priority over keys later in the list.

The selection of the partition locations depends on the reason for the hash failure. In general, the partition locations should be placed so as to separate conflicting keys. For example, if the hash failure arose because no suitable bits for the hash could be found from the given input, the set of keys may simply be divided in two so that the partition location is placed in the middle of the sequence of keys. This location is chosen because this type of failure does not have any associated feedback on which keys in particular caused the error, and the processor simply knows that the set of keys as a whole was not suitable. Or, for example, if incompatible keys cause a hash failure, the incompatible keys may need to be separated into separate hash tables. For example, the key may only test a subset of the full TLA matching information, so that it is not discovered that two keys are incompatible until the hash table generation. If this type of incompatibility is discovered, the partition location is placed between the two incompatible keys to ensure that they are divided into different subsets of keys.

Or, for example, if an excess number of collisions causes a hash failure, e.g., the number of collisions exceeds N collisions, then the partition location is selected to divide the set of keys in order to reduce the number of collisions below N. For example, if a fourth key is found with a particular hash code, the partition location may be placed immediately before the location of the third key, such that each subset of keys has only two conflicting keys (the first subset contains the first and second conflicting keys, and the second subset contains the third and fourth conflicting keys). The maximum number of collisions N may be a predetermined maximum number of collisions set by a user, or may be a set number of collisions able to handled by the hardware in which the hash function is implemented, or may be any other suitable number. The partitioning may be recursive, e.g., if one of the resultant subsets of keys also results in a hash failure, then that subset may be split into two or more subsets by placing a second partition location in the subset of keys.

Figure 5:
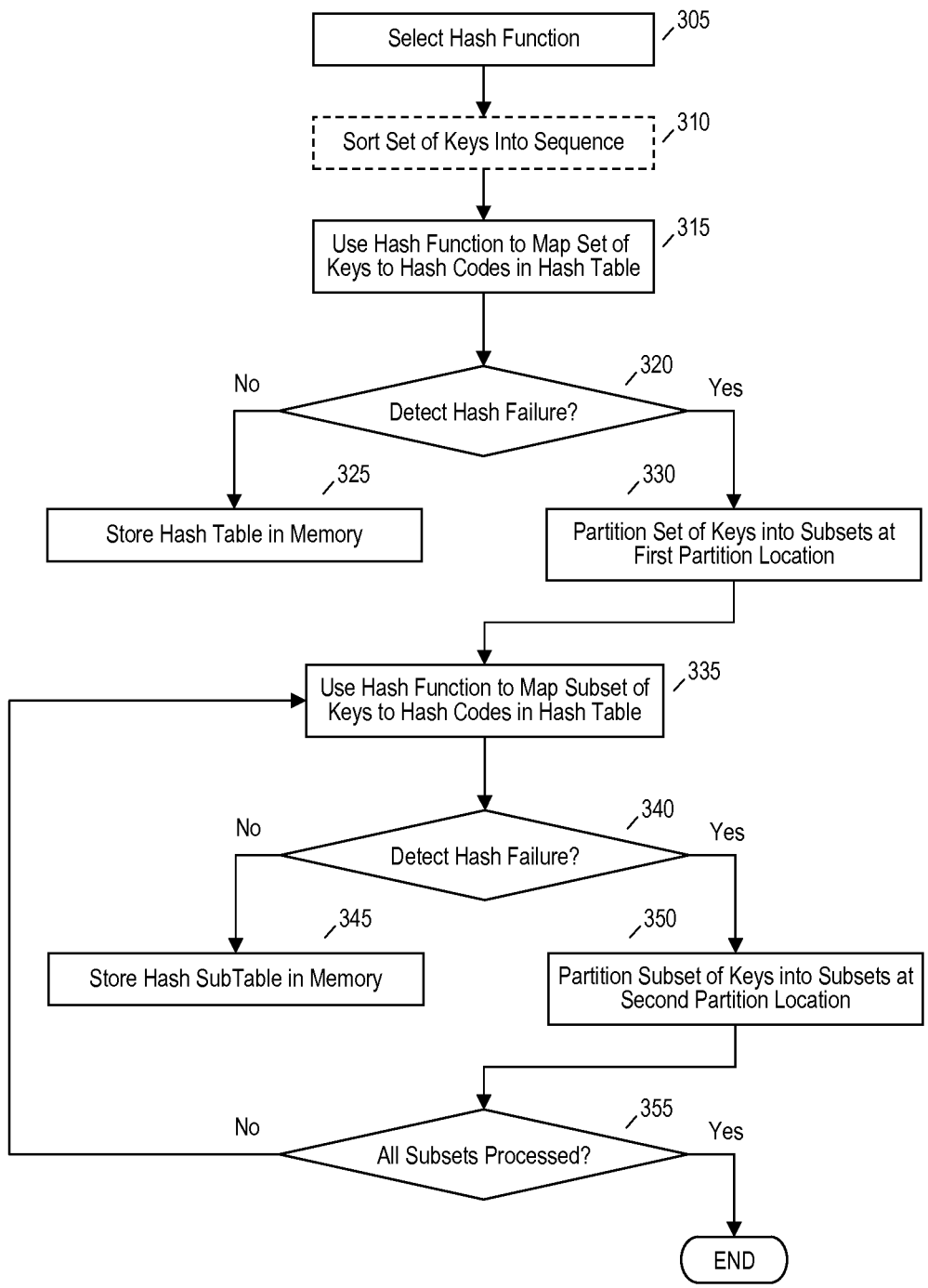
FIG. 5 is a flowchart depicting an exemplary process for partitioning keys according to an embodiment of the present invention.

Referring now to FIG. 5, reference numeral 300 generally designates a flow chart depicting an exemplary method of partitioning keys for a hash table, which may be carried out by the computer system 10 or SOA appliance 130 as previously described. In step 305, the processor of the computer system or SOA appliance selects a hash function, which may be selected based on the nature of the set of keys. In step 310, the processor may optionally sort the set of keys into a sequence based on priority; this step is optional because the set of keys may be pre-sorted. In step 315, the processor uses the selected hash function to map the set of keys to a corresponding set of hash codes in the hash table, and in step 320 the processor detects whether a hash failure has occurred, and if not, proceeds to step 325 and stores the hash table including the generated hash codes in memory. If a hash failure is detected, then in step 330 the processor partitions the set of keys at a first partition location within the sequence to form a plurality of individually mapped subsets of keys. The first partition location is variable and is based on the detected hash failure, as previously described.

After partitioning, the processor in step 335 uses the selected hash function to map the subset of keys to a corresponding set of hash codes in a hash subtable, and in step 340 the processor detects whether a hash failure has occurred in the hash subtable, and if not, proceeds to step 345 and stores the hash subtable including the generated hash codes in memory. If a hash failure is detected, then in step 350 the processor partitions the subset of keys at a second partition location within the sequence to form a plurality of individually mapped subsets of the subset of keys. The second partition location is variable and is based on the detected hash failure, as previously described. The processor then determines in step 355 if there are additional subsets of keys to process, and if so, returns to step 335. If not, the process ends. Although flow chart 300 generally depicts the subsets as being processed sequentially, it is understood that the subsets may be processed concurrently, simultaneously, or in any other suitable fashion.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., VHDL (VHSIC hardware description language), an object oriented programming language such as Java, Smalltalk, C++or the like, or a conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for accessing data in a computer useable memory comprising:
   generating a hash table for a computer useable memory via a processor by using a hash function to map a set of keys to a corresponding set of hash codes in the hash table, wherein the keys within the set are mapped in a sequence ordered otherwise than according to the hash codes;
   detecting a hash failure based on collisions resulting from the hash function mapping the set of keys;
   in response to detecting the hash failure, selecting a first partition location within the sequence to divide the sequence into a plurality of contiguous subsequences, wherein the first partition location is variable and is based on the detected hash failure;
   partitioning the set of keys into a plurality of individually mapped subsets of keys corresponding to the plurality of contiguous subsequences with each of the subsets of keys mapped to a different corresponding hash subtable, wherein the keys within each subset belong to the corresponding contiguous subsequence, and at least two different hash subtables include a common hash code; and
   applying a key of a data item within the set of keys to the hash table to access a corresponding location in the computer useable memory for the data item.

2. The method of claim 1,
   wherein said detection comprises:
   detecting a number of collisions in the hash table; and
   determining that a hash failure has occurred if the number of detected collisions exceeds a predetermined maximum number of collisions; and
   wherein the first partition location is based on the number of detected collisions.

3. The method of claim 1, further comprising:
   repeating said generation of a hash table individually for each subset of the keys in the plurality to generate a plurality of hash subtables, wherein each hash subtable corresponds to one of the subsets of keys, and wherein the keys within each subset are mapped in a subsequence.

4. The method of claim 3, further comprising for each hash subtable in the plurality of hash subtables:
   detecting a hash failure in the hash subtable based on collisions resulting from the hash function mapping the corresponding subset of keys; and
   in response to detecting the hash failure in the hash subtable, partitioning the subset of keys at a second partition location within the subsequence to form a plurality of individually mapped subsets of the corresponding subset of keys, wherein the second partition location is variable and is based on the detected hash failure in the hash subtable.

5. The method of claim 4, wherein the hash failure in the hash subtable is a number of detected collisions that exceeds a predetermined maximum number of collisions.

6. The method of claim 1, further comprising:
   selecting the hash function based on the set of keys.

7. The method of claim 1, wherein the sequence of the keys in the set is based on priority such that higher priority keys are mapped before lower priority keys.

8. The method of claim 1, wherein the set of keys are mapped in an ordered sequence and each hash subtable is associated with consecutive keys of the ordered sequence.

9. A computer program product for accessing data in a computer useable memory comprising:
   a non-transitory computer readable storage medium having computer readable program code embodied therewith, the computer readable program code comprising computer readable program code configured to:
   generate a hash table for a computer useable memory via a processor by using a hash function to map a set of keys to a corresponding set of hash codes in the hash table, wherein the keys within the set are mapped in a sequence ordered otherwise than according to the hash codes;
   detect a hash failure based on collisions resulting from the hash function mapping the set of keys;
   in response to detecting the hash failure, select a first partition location within the sequence to divide the sequence into a plurality of contiguous subsequences, wherein the first partition location is variable and is based on the detected hash failure;
   partition the set of keys into a plurality of individually mapped subsets of keys corresponding to the plurality of contiguous subsequences with each of the subsets of keys mapped to a different corresponding hash subtable, wherein the keys within each subset belong to the corresponding contiguous subsequence, and at least two different hash subtables include a common hash code; and apply a key of a data item within the set of keys to the hash table to access a corresponding location in the computer useable memory for the data item.

10. The computer program product of claim 9, wherein said detection of the hash failure comprises:
detecting a number of collisions in the hash table; and
determining that a hash failure has occurred if the number of detected collisions exceeds a predetermined maximum number of collisions;
wherein the first partition location is based on the number of detected collisions.

11. The computer program product of claim 9, wherein the computer readable program code is further configured to:
repeat said generation of a hash table individually for each subset of the keys in the plurality to generate a plurality of hash subtables, wherein each hash subtable corresponds to one of the subsets of keys, and wherein the keys within each subset are mapped in a subsequence.

12. The computer program product of claim 11, wherein the computer readable program code is further configured to, for each hash subtable in the plurality of hash subtables:
detect a hash failure in the hash subtable based on collisions resulting from the hash function mapping the corresponding subset of keys; and
in response to detecting the hash failure in the hash subtable, partition the subset of keys at a second partition location within the subsequence to form a plurality of individually mapped subsets of the corresponding subset of keys, wherein the second partition location is variable and is based on the detected hash failure in the hash subtable.

13. The computer program product of claim 12, wherein the hash failure in the hash subtable is a number of detected collisions that exceeds a predetermined maximum number of collisions.

14. The computer program product of claim 9, wherein the computer readable program code is further configured to:
select the hash function based on the set of keys.

15. The computer program product of claim 9, wherein the sequence of the keys in the set is based on priority such that higher priority keys are mapped before lower priority keys.

16. The computer program product of claim 9, wherein the computer program product is stored on an XML appliance.

17. The computer program product of claim 9, wherein the set of keys are mapped in an ordered sequence and each hash subtable is associated with consecutive keys of the ordered sequence.

18. A system comprising:
a memory; and
a processor configured with logic to:
generate a hash table for a computer useable memory via the processor by using a hash function to map a set of keys to a corresponding set of hash codes in the hash table, wherein the keys within the set are mapped in a sequence ordered otherwise than according to the hash codes;
detect a hash failure based on collisions resulting from the hash function mapping the set of keys;
in response to detecting the hash failure, select a first partition location within the sequence to divide the sequence into a plurality of contiguous subsequences, wherein the first partition location is variable and is based on the detected hash failure;
partition the set of keys into a plurality of individually mapped subsets of keys corresponding to the plurality of contiguous subsequences with each of the subsets of keys mapped to a different corresponding hash subtable, wherein the keys within each subset belong to the corresponding contiguous subsequence, and at least two different hash subtables include a common hash code; and
apply a key of a data item within the set of keys to the hash table to access a corresponding location in the computer useable memory for the data item.

19. The system of claim 18, wherein the processor is further configured with the logic to:
repeat said generation of a hash table individually for each subset of the keys in the plurality to generate a plurality of hash subtables, wherein each hash subtable corresponds to one of the subsets of keys, and wherein the keys within each subset are mapped in a subsequence.

20. The system of claim 19, wherein the processor is further configured with the logic to, for each hash subtable in the plurality of hash subtables:
detect a hash failure in the hash subtable based on collisions resulting from the hash function mapping the corresponding subset of keys; and
in response to detecting the hash failure in the hash subtable, partition the subset of keys at a second partition location within the subsequence to form a plurality of individually mapped subsets of the corresponding subset of keys, wherein the second partition location is variable and is based on the detected hash failure in the hash subtable.

21. The system of claim 18, wherein the system is an Extensible Markup Language(XML) appliance.

22. The system of claim 18, wherein the system is a synchronous dynamic random access memory (SDRAM)-based ternary content addressable memory (TCAM) emulator, and wherein the memory in which the hash table is stored is SDRAM memory.

23. The system of claim 18, wherein the set of keys are mapped in an ordered sequence and each hash subtable is associated with consecutive keys of the ordered sequence.

* * * * *